United States Patent
Mayr et al.

(10) Patent No.: US 6,837,477 B2
(45) Date of Patent: Jan. 4, 2005

(54) PROPORTIONAL PRESSURE-REGULATOR VALVE

(75) Inventors: Karlheinz Mayr, Bregenz (AT); Walter Kill, Friedrichshafen (DE); Thilo Schmidt, Meckenbeuren (DE); Gunter Philipp, Eriskirch-Mariabrunn (DE); Hubert Remmlinger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/665,046

(22) Filed: Sep. 17, 2003

(65) Prior Publication Data

US 2004/0056227 A1 Mar. 25, 2004

(30) Foreign Application Priority Data

Sep. 25, 2002 (DE) .......................................... 102 44 527

(51) Int. Cl.[7] ............................................. F16K 31/02
(52) U.S. Cl. ............................... 251/129.08; 251/129.07
(58) Field of Search ......................... 251/129.01–129.22

(56) References Cited

U.S. PATENT DOCUMENTS

| | | | | |
|---|---|---|---|---|
| 5,337,785 A | * | 8/1994 | Romer | ................. 137/625.65 |
| 5,443,309 A | * | 8/1995 | Beck | ...................... 303/119.2 |
| 6,005,462 A | * | 12/1999 | Myers | ....................... 335/220 |
| 6,120,003 A | * | 9/2000 | Lubischer et al. | ..... 251/129.02 |

FOREIGN PATENT DOCUMENTS

| | | | | |
|---|---|---|---|---|
| DE | 199 01 679 A1 | 8/1999 | ............. | H01F/7/13 |
| DE | 100 03 896 A1 | 8/2001 | ............. | H01F/7/18 |
| DE | 101 17 608 A1 | 5/2002 | ........... | F16K/31/06 |
| EP | 0 875 702 A2 | 11/1998 | ........... | F16K/31/06 |
| EP | 0 752 152 B1 | 5/2000 | ............. | H01F/7/13 |

* cited by examiner

*Primary Examiner*—Paul J. Hirsch
(74) *Attorney, Agent, or Firm*—Davis & Bujold, P.L.L.C.

(57) ABSTRACT

A proportional pressure-regulator valve comprising a load-dependent control step and a method for the load-dependent regulation of a pressure level of a pressure medium with one proportional pressure-regulator valve. The load-dependent control step is obtained with a proportional magnet (1) having at least two gaps (10, 12) for regulating the magnetic force. The size of the gaps (10, 12) can be adjusted independently of each other. While a first gap (!2) is current-dependent regulated, the size of the second gap (10) can be regulated via a pressure force adaptable in proportion to a load requirement in the hydraulic circuit.

22 Claims, 2 Drawing Sheets

PROPORTIONAL PRESSURE-REGULATOR VALVE

FIELD OF THE INVENTION

The instant invention relates to a proportional pressure-regulator valve. The invention further covers a method for regulating a pressure level of a pressure medium with a proportional pressure-regulator valve.

BACKGROUND OF THE INVENTION

In a transmission, particularly an automatic transmission of a motor vehicle, the pressure is regulated in a hydraulic circuit according to requirements. While for the supply of lubricating oil to the parts of the transmission, the pressure level can be kept low in a hydraulic circuit, during the shifting operations the pressure has to be sharpy raised in order, for example, to be quickly able to fill shifting elements.

According to the prior art, there have been used for regulating the pressure in hydraulic circuits pressure regulators which control shift valves for actuating the clutch. The shift valves are controlled within the pressure regulator by means of a proportional magnet consisting, among other elements, of a magnetic core, a magnetic coil and a magnetic armature. The proportional magnet controls here the coil current proportionally to an output variable force, that is, according to the coil current the magnetic armature and therewith the shift valve are controlled for actuating the clutch. From the resulting characteristic magnetic force-current characteristic lines of the pressure regulator are produced in an electrohydraulic control of automatic transmissions the pressure-current characteristic lines desired for clutch adaptation.

In the Applicant's German Patent Application DE 100 03 896 A1, a pressure regulator is described which adjusts as needed a shift valve by means of a stationary proportional magnet, a magnetic coil, a movable magnetic armature and a specific control system thus regulating the pressure in the hydraulic circuit. The pressure-current characteristic line has a curve continuously rising from the start on, that is, as the current force increases so increases the pressure also. But in the practice, the gradient of the pressure-current characteristic line is in operation too large for the requirements so that the pressure-current characteristic line is too steep and thereby the current sensitivity of the pressure regulation is not enough for a comfortable gear ratio. In case of a low load, that is, at low pressures, the low sensitivity makes itself noticeable specifically in a poor shifting quality.

Therefore, the invention is based on the problem of overcoming the disadvantages of the prior art and, in particular, of providing a proportional pressure-regulator valve for regulating a pressure level in a hydraulic circuit and of outlining a method by which the changes of pressure level in a hydraulic circuit are adjusted to be as comfortable as possible and showing how such a proportional pressure-regulator valve is controlled.

The problem on which the invention is based is solved by a proportional pressure-regulator valve and a method of regulating a pressure level in a hydraulic circuit with a proportional pressure-regulating valve.

SUMMARY OF THE INVENTION

The requirement of a high pressure-current sensitivity, above all in the low-pressure range, is satisfied by a load-dependent adaptation of the pressure-current characteristic line, herebelow called a p-I characteristic line for the sake of simplicity.

The load-dependent adaptation of the p-I characteristic line of the inventive proportional pressure-regulator valve is implemented by a proportional magnet having two gaps that can be controlled independently of each other. The first gap is part of an immersion step known from the prior art which is controlled by means of induced magnetic field. Said magnetic field is produced by an electric current in the magnetic coil, it then proceeds via the magnetic armature existing in the interior of the magnetic coil, the housing and the magnetic core. An axial separation between the magnetic armature and the magnetic core by means of a non-magnetic ring results in that the magnetic field can pass over to the magnetic armature only via a radial gap. At this point, the magnetic field produces a magnetic force that acts upon the magnetic armature and moves it in axial direction depending on the magnetic force. A continuous electric control respectively of the proportional magnet and of the magnetic coil in this manner makes possible a continuous control respectively of the magnetic armature and of a control element connected by an armature rod with the magnetic armature.

According to the invention, there is additionally obtained respectively via a second gap and a second immersion step, a targeted weakening of the magnetic field. The second gap is implemented by using an inventive magnetic core consisting of at least two parts, specifically a first and a second part.

The first part of the magnetic core is firmly connected with the housing, located concentrically and axially movable around the armature rod fixedly connected with the magnetic armature. The first part of the magnetic core projects partly into the interior of the magnetic coil.

The second part of the magnetic core is, likewise coaxially, concentrically and axially movably disposed around the armature rod. But the second part, contrary to the first part firmly connected with the housing, is axially freely movable. The second part of the magnetic core is, therefore, implemented in the manner of a sliding part which is situated adapted to be laid on the first part and preferably provided axially between the first part of the magnetic core and the housing.

This division of the magnetic core in a first part firmly connected with the housing and a second part axially movably disposed makes possible an adjustment of the width of the second gap which can be formed between said two parts.

Thus is made possible a control as needed of the second gap. The second gap constitutes, like the first gap, a magnetic resistance in the magnetic circuit. The larger said gap widths are, the greater the magnetic resistance and weaker the magnetic field in the magnetic circuit. The position of the second part of the magnetic core which determines the size of the second gap, therefore, affects the magnetic resistance in the magnetic circuit and consequently the strength of the magnetic field.

This means that, for example, a large second gap altogether weakens the magnetic field and thus the magnetic force is reduced between the first part of the magnetic core and the magnetic armature. The regulation, via the electric current on the magnetic coil in this case, is less sensitive on account of the high magnetic resistance. The gradient of the p-I characteristic line is then smaller than in a small second gap, which means that the current sensitivity of the pressure adjustment is lower and thus is given a high cancellation of the possibility of pressure adjustment. This advantageously takes effect above all in the low-pressure range, since in this range changes of pressure are particularly detectable.

The first and the second part of the magnetic core advantageously have corresponding contact surfaces the design of which in the second gap produces a radial magnetic crossing of field line between the second and the first part of the magnetic core.

The second part of the magnetic core is preferably implemented by a conic shift valve. The shape of the cone has a great influence upon the properties of the proportional magnet. The cone angle determines the portion of the radial and axial forces that can be transmitted by the magnetic flow to the shift valve and to the second part of the magnetic core. The radial forces level over the periphery. A high portion thereof is therefore to be sought. But axial forces are also needed in order to effect a stroke-dependent magnetic flow change. The axial forces should, of course, be as weak as possible, since otherwise a second regulation point generates and non-linearities can appear in the p-I behavior of the proportional pressure-regulator valve. This would result in negative regulation quality. Besides, a working point in the characteristic field would not be clearly adjustable having two regulation points. The proportional magnet should, therefore, be regulated mainly via the first gap. Furthermore, the influence of the second gap should be certain from the point of view of regulation technology.

The second magnet core is controlled by a pressure force which is preferably hydraulic but can also be produced pneumatically or mechanically. The pressure force advantageously adjusts itself according to a load requirement in the transmission, especially in case of a hydraulic control depending on a hydraulic pressure in the hydraulic circuit. The hydraulic pressure as command variable for control of the second gap is either the main pressure itself, a pressure proportional to the main pressure, or the issued pressure proper.

With the dependence of the pressure force on the load requirement in the transmission, a proportional lowering of the p-I characteristic line is possible in the partial load range.

Summarizing, the inventive proportional pressure-regulator valve can be shown with the following advantages.

The inventive proportional pressure-regulator valve and method make possible two effective engagement parameters independently of each other for the control of a pressure level, especially of a gear clutch pressure. The reduced gradient of the p-I characteristic line in the partial load range produces the increase of sensitivity of the p-I.

If the issued pressure is used as command variable for the control of the second gap, it is possible to obtain a high p-I sensitivity in the low-pressure range and a correspondingly low sensitivity in the high-pressure range.

In a development of the invention, it is provided that the pressure force is axially passed into the second part of the magnetic core via a shift valve. Said shift valve can be laid non-positively on the second part of the magnetic core and preferably has the shape of a hollow cylindrical sleeve which has a substantially annular pressure surface. Said pressure surface is connected with a feed line of the hydraulic circuit and, therefore, can be loaded with a hydraulic pressure force. The shift valve is thus actuated by a hydraulic pressure proportional to a load requirement in the hydraulic circuit.

This means that the second gap is controlled depending on load and thus respectively the magnetic field and the magnetic force between magnetic armature and the first part of the magnetic core are influenced depending on load.

In one other development of the invention, it is provided that the hydraulic control of the second gap be ensured via several axial holes. The shift valve does not sit directly upon the armature rod but on the pole core. The system thereby acquires a stable behavior, since the width-to-height ratio is considerably improved. Besides, this control also makes an accurate positioning of the second part of the magnetic core possible.

BRIEF DESCRIPTION OF THE DRAWINGS

The invention will now be described, by way of example, with reference to the accompanying drawings in which.

DETAILED DESCRIPTION OF THE INVENTION

Figure 1:
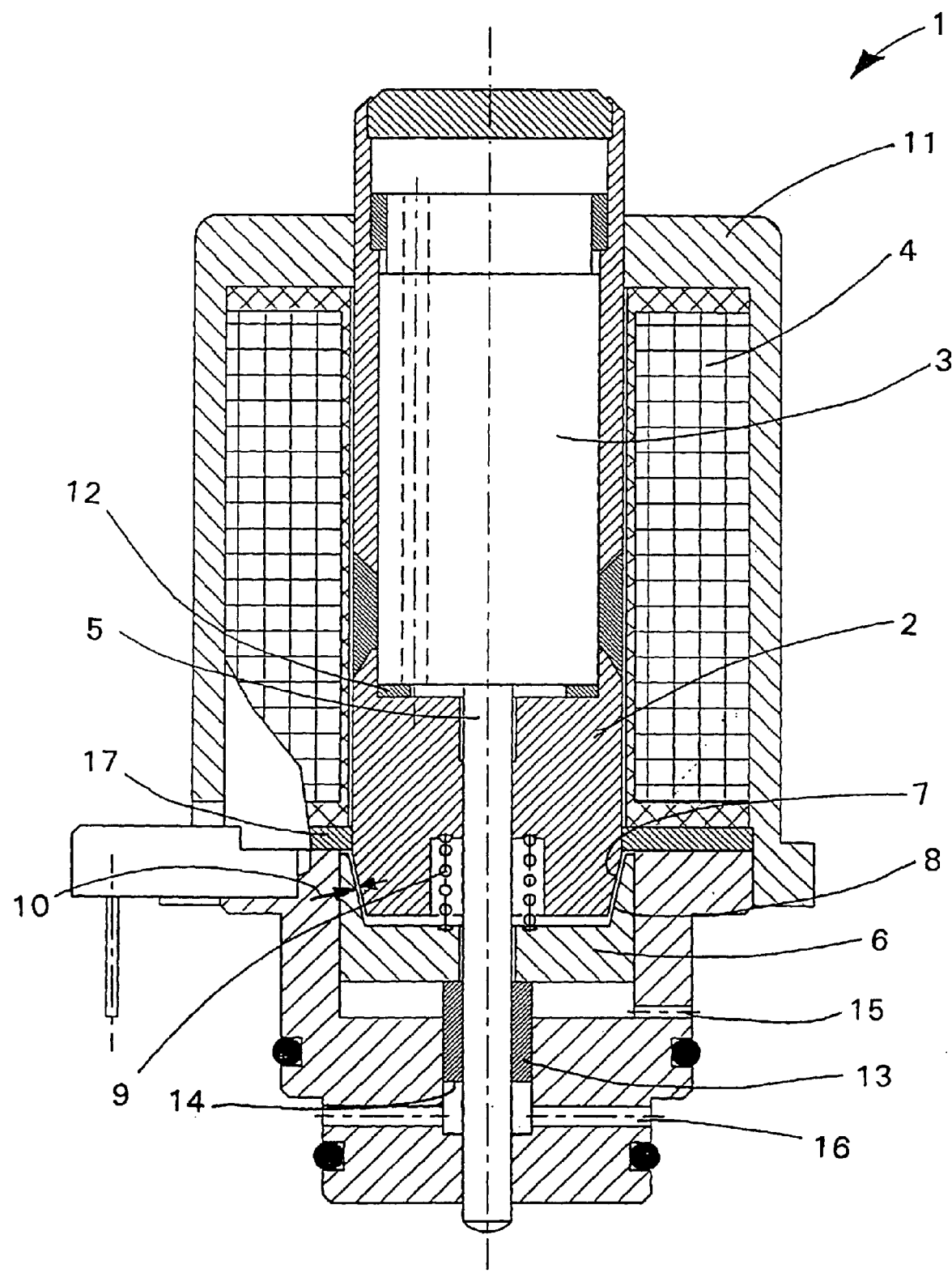
FIG. 1 is a longitudinal section of a proportional magnet with a hydraulic control of the second air gap.

In FIG. 1 is shown a longitudinal section of a proportional magnet 1. The proportional magnet 1 consists, among other elements, of one magnetic coil 4, one magnetic armature 3 movable in the interior of the magnetic oil, one armature rod 5 fixedly connected with the magnetic armature 3 and a two-part magnetic core. The magnetic core has one first part 2 and one second part 6. Both parts 2, 6 are disposed coaxially, concentrically and movably relative to the armature rod 5. While the first part 2 is firmly connected with the housing 11, the second part 6 is provided axially movable in the proportional magnet 1. If an electric current flows into the magnetic coil 6, a magnetic field is generated whose magnetic flow passes into a magnetic circuit via the housing 11, the magnetic core and the magnetic armature 3. At the same time, there is a magnetic source generated in a first gap 12 between the first part of the magnetic core 2 and the magnetic armature 3, which attracts the magnetic armature 3. The consequence of said movement of the magnetic armature 3 is an actuation of the control element via the armature rod 5.

With the second part of the magnetic core 6, a second gap 10 can be adjusted in the magnetic circuit which, depending on its magnitude, constitutes a magnetic resistance. The larger the second gap 10 is, the larger the magnetic resistance in the magnetic circuit and the smaller the magnetic flow. The consequence of the change of the magnetic flow is directly a change of the magnetic force in the first gap 12 and, therefore, also respectively effects upon the movement of the magnetic armature 3 and the actuation of the control element.

The second part of the magnetic core 6 is moved by a pressure force. In the embodiment shown, the pressure force results hydraulically. A shift valve 13, which can be non-positively laid on the second part of the magnetic core 6, guides the pressure force axially into the second part of the magnetic core 6. The shift valve 13 is designed as hollow cylindrical sleeve which is located in a hole of the housing 11 and seals it as oil tight as possible. Said shift valve 13 provides a pressure surface which with a feed line 16 is connected to the hydraulic circuit which thereby is loaded with a hydraulic pressure force. The hydraulic pressure force corresponds here to the main pressure or is proportional to the main pressure or is the issued pressure proper. The actuation of the second part of the magnetic core 6 is thus dependent on a load requirement which reflects itself in the pressure level in a hydraulic circuit. There is further provided in the housing 11 a breather hole 15 in order to ventilate the space formed by the shift valve 13, the second part of the magnetic core 6 and the housing 11 and to discharge from the interior of the housing leakage oil that eventually appears.

A pressure spring 9 between the first part 2 and the second part 6 of the magnetic core again resets the second part of the magnetic core 6 as soon as the hydraulic force is reduced.

There is also provided a non-magnetic disc 17 which, on one hand, firmly connects the first part of the magnetic core 2 with the housing and, on the other, diverts the magnetic flow so that it has to flow first via the second part 2, then via the first part of the magnetic core 6.

This geometry ensures that the magnetic flow has to flow via two gaps 10, 12 the size of which can be influenced independently of each other. Thus the magnetic force, which ultimately produces respectively the movement of the magnetic armature 3 and the actuation of the control element, is adjusted by two parameters determinable independently of each other.

The first adjustable parameter is here the current strength in the magnetic coil 4 and the second parameter a variable adapted according to the load requirement, for example, the hydraulic pressure in a hydraulic circuit. The combination of said two parameters makes possible the load adaptation of a control for a proportional magnet and achieves a favorable pressure-current sensitivity in a desired range of pressure.

Figure 2:
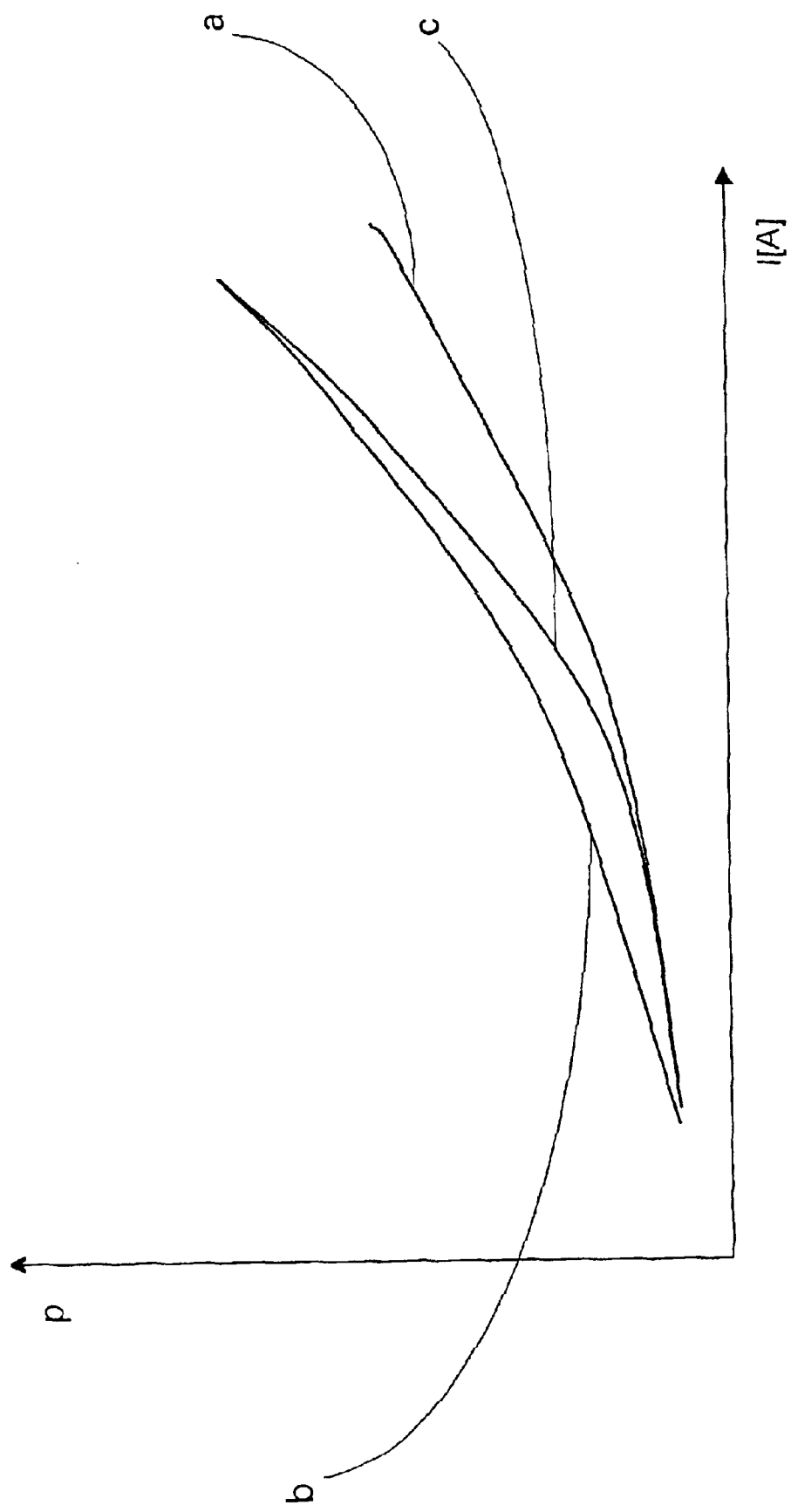
FIG. 2 is a p-I characteristic line field of the inventive proportional pressure-regulator valve.

In FIG. 2 is shown a characteristic line field with three p-I characteristic lines. The characteristic line a represents the p-I characteristic line with maximum size of the second gap 10, characteristic line b the p-I characteristic line with minimum size of the second gap 10 and characteristic line c the p-I characteristic line with the individual output pressure as commanding variable.

In the comparison of the characteristic lines a and b can be clearly understood that the gradient of the characteristic line b is larger than that of the characteristic line a. Therefrom is to be interpreted that the p-I sensitivity depends on the size of the second gap 10 and this in a manner such that the p-I sensitivity increases as the size of the second gap 10 increases.

The characteristic line c shows a p-I sensitivity initially of a magnitude similar to the characteristic line a. But starting from a certain value it proceeds more abruptly and approximates the curve of characteristic line b. Therefore, with the individual output pressure as command variable, a large p-I sensitivity can be achieved in the lower-pressure range and a reduced p-I sensitivity in the high-pressure range.

Reference Numrals
1 proportional magnet
2 first part of the magnet core
3 magnetic armature
4 magnetic coil
5 armature rod
6 second part of the magnetic core
7 contact surface of the first part of the magnetic core
8 contact surface of the second part of the magnetic core
9 pressure spring
10 second gap
11 housing
12 gap
13 shift valve, sleeve
14 pressure surface
15 breather hole
16 feed line
7 non-magnetic disc

What is claimed is:

1. A proportional pressure-regulator valve for regulating a pressure level in a hydraulic circuit, comprising:
   a housing containing an armature rod (5) extending between a proportional magnet (1) in the housing and a control element situated in the hydraulic circuit;
   the proportional magnet (1) having a magnetic coil (4), a magnetic core and a magnetic armature (3) connected to the armature rod (5), and said magnetic coil (4) and at least a part of said magnetic core are firmly connected with said housing (11);
   a magnetic force existing within a first gap (12) between said magnetic armature (3) and said magnetic core for axially moving said magnetic armature (3) back and forth between a first and a second end positions within an interior space of said magnetic coil (4);
   said magnetic core partly projects into the interior space of said magnetic coil (4) and is concurrently concentrically situated about said armature rod (5) and the motion of said magnetic armature (3) relative to said first magnetic core results in an actuation of said control element, and
   wherein said proportional magnet (1) also has an adjustable second gap (10) for regulating the magnetic force axially moving said magnetic armature (3).

2. The proportional pressure-regulator valve according to claim 1, wherein said magnetic core comprises at least one first part (2) and one second part (6) provided coaxially about said armature rod (5).

3. The proportional pressure-regulator valve according to claim 2, wherein said second part of said magnetic core (6) is positioned axially movable between said first part of said magnetic core (6) and said housing (11) to define the adjustable second gap (10) for said first part of said magnetic core (2).

4. The proportional pressure-regulator valve according to claim 2, wherein said first part of said magnetic core (6) is disposed concentrically around said armature rod (5) and the relative axial motion of said second part of said magnetic core (6) results from a pressure force.

5. The proportional pressure-regulator valve according to claim 4, wherein to produce the pressure force, a shift valve (13), which can be removably contacted with said second part of said magnetic core (6) to axially supply the pressure force to said second part of said magnetic core (6).

6. The proportional pressure-regulator valve according to claim 5, wherein said shift valve (13) is made of non-magnetic material and is concentrically disposed around and axially movably relative to said armature rod (5).

7. The proportional pressure-regulator valve according to claim 4, wherein the pressure force can be produced hydraulically, pneumatically, or mechanically.

8. The proportional pressure-regulator valve according to claim 7, wherein said shift valve (13) is actuated in proportion respectively to a load requirement and a hydraulic pressure in the hydraulic circuit.

9. The proportional pressure-regulator valve according to claim 5, wherein said shift valve (13) is designed as a hollow cylindrical sleeve which is located in a passage of said housing (11) and seals the passage oil-tight.

10. The proportional pressure-regulator valve according to claim 5, wherein said shift valve (13) has on a front side a substantially annular pressure surface which is connected with a feed line (16) of the hydraulic circuit and can be loaded with a hydraulic pressure force.

11. The proportional pressure-regulator valve according to claim 2, wherein said first part (2) and said second part (6)

of said magnetic core have corresponding contact surfaces (7, 8) which produce in the second gap (10) a radial magnetic field line crossing between said second part (6) and said first part (2) of said magnetic core.

12. The proportional pressure-regulator valve according to claim 11, wherein said contact surface (7) of said first part (2) of said magnetic core is situated upon an outer cone.

13. The proportional pressure-regulator valve according to claim 11, wherein said contact surface (8) of said second part (6) of said magnetic core is designed upon an inner cone.

14. The proportional pressure-regulator valve according to claim 5, further comprising a breather hole (15) in said housing (11) which ventilates the space formed by said shift valve (13), said second part of said magnetic core (6) and said housing (11).

15. The proportional pressure-regulator valve according to claim 2, wherein between said second part (6) and said first part (2) of said magnetic core (6), concentrically with said armature rod (5), a pressure spring (9) is disposed which produces a spring tension between said second part (6) and said first part (2) of said magnetic core and said shift valve (13) and wherein said spring tension counteracts the hydraulic pressure force.

16. The proportional pressure-regulator valve according to claim 2, wherein a non-magnetic disc (17) is provided which firmly connects the first part (2) of said magnetic core with said housing (11).

17. A method for regulating a pressure level in a hydraulic circuit with one proportional pressure-regulator valve comprising the steps of:

providing an armature rod (5) extending between a control element located in the hydraulic circuit with a proportional magnet comprising a magnetic core, a magnetic armature (3) and a magnetic coil (4);

axially moving said magnetic armature (3) back and forth between a first and a second end positions according to a magnetic force existing in an air gap (18) controlling the magnetic force according to a magnetic flow in a magnetic circuit which is adjustable by an amount of electric current applied to said magnetic coil (4);

providing a magnetic core comprising at least one first part (2) and one second part (6); and creating in the magnetic circuit a second gap (10) to generate a magnetic resistance for regulating the magnetic force.

18. The method according to claim 17, further comprising the step of adjusting said second gap (10) by moving a second part of said magnetic core (6) positioned coaxially about said armature rod (5).

19. The method according to claim 18, further comprising the step of hydraulically, pneumatically or mechanically actuating a shift valve (13) to move said second part of said magnetic core (6).

20. The method according to claim 19, further comprising the step of actuating said shift valve (13) by a hydraulic pressure proportional to a load requirement in the hydraulic circuit and adjusting the magnetic force according to the electric current flowing into said magnetic coil (4) and the load requirement in the hydraulic circuit.

21. The method according to claim 17, further comprising the step of adjusting the magnetic force between said first part of said magnetic core (2) and the magnetic armature (3) as the width of said second gap (10) diminishes and the magnetic resistance in the magnetic circuit becomes weaker.

22. The method according to claim 17, further comprising the steps of positioning a pressure spring between said second part (6) and said first part (2) of said magnetic core, which, as the hydraulic force diminishes on said second part of said magnetic core (6), the second part moves away from said first part of said magnetic core (2) enlarging said second gap (10) between said second part (6) and said first part (2) of the magnetic core and diminishing the magnetic force.

* * * * *